United States Patent
Zhang et al.

(10) Patent No.: US 12,554,927 B2
(45) Date of Patent: Feb. 17, 2026

(54) MACHINE LEARNING-BASED LITERATURE SEARCH AND RETRIEVAL AND RELATED MACHINE LEARNING MODEL TRAINING METHODS

(71) Applicant: The Florida State University Research Foundation, Inc., Tallahassee, FL (US)

(72) Inventors: Jinfeng Zhang, Tallahassee, FL (US); Chun-Chao Lo, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 230 days.

(21) Appl. No.: 18/239,455

(22) Filed: Aug. 29, 2023

(65) Prior Publication Data
US 2024/0078381 A1 Mar. 7, 2024

Related U.S. Application Data

(60) Provisional application No. 63/401,774, filed on Aug. 29, 2022.

(51) Int. Cl.
*G06F 40/216* (2020.01)
*G06N 3/091* (2023.01)

(52) U.S. Cl.
CPC ........... *G06F 40/216* (2020.01); *G06N 3/091* (2023.01)

(58) Field of Classification Search
CPC ........ G06F 40/216; G06N 3/091; G06N 3/09; G06N 3/045
See application file for complete search history.

(56) References Cited

U.S. PATENT DOCUMENTS

| 2021/0109958 A1* | 4/2021 | Behtash | G06F 18/214 |
| 2021/0142181 A1* | 5/2021 | Liu | G06N 3/045 |
| 2024/0054285 A1* | 2/2024 | Mendes | G06F 40/205 |

OTHER PUBLICATIONS

Kayalvizhi et al., Best Matching Algorithm to Identify and Rank the Relevant Statutes, Dec. 16-20, 2020, https://ceur-ws.org/Vol-2826/T1-6.pdf (Year: 2020).*
L. Yeganova, et al., "How to Interpret PubMed Queries and Why It Matters," J Am Soc Inf Sci Technol, vol. 60, pp. 264-274, Feb. 2009.
L. J. Jensen, et al., "Literature mining for the biologist: from information retrieval to biological discovery," Nat Rev Genet, vol. 7, pp. 119-129, Feb. 2006.

(Continued)

Primary Examiner — Linda Wong
(74) Attorney, Agent, or Firm — Meunier Carlin & Curfman LLC

(57) ABSTRACT

Described herein are systems and methods for performing literature retrieval and related machine learning model training methods. An example computer-implemented method of training a machine learning model configured for literature retrieval I includes receiving a plurality of full-text articles; extracting, from the plurality of full-text articles, a plurality of positive sentence-citation pairs, each positive sentence-citation pair comprising a respective citing sentence and at least one cited article that is associated with the respective citing sentence; creating a labeled dataset comprising the plurality of positive sentence-citation pairs; and training a machine learning model using the labeled dataset.

17 Claims, 13 Drawing Sheets

(56) References Cited

OTHER PUBLICATIONS

J. Jiang and C. Zhai, "An empirical study of tokenization strategies for biomedical information retrieval," Information Retrieval, vol. 10, pp. 341-363, Oct. 1, 2007 2007.
Z. Lu, et al., "Evaluating relevance ranking strategies for MEDLINE retrieval," J Am Med Inform Assoc, vol. 16, pp. 32-36, Jan.-Feb. 2009.
Z. Lu, et al., "Evaluation of Query Expansion Using MeSH in PubMed," Inf Retr Boston, vol. 12, pp. 69-80, 2009.
W. J. Wilbur, et al., "Spelling Correction in the Pubmed Search Engine," Inf Retr Boston, vol. 9, pp. 543-564, Nov. 2006.
Z. Lu, et al., "Finding query suggestions for PubMed," AMIA Annu Symp Proc, vol. 2009, pp. 396-400, Nov. 14, 2009.
S. Mohan, et al., "Deep Learning for Biomedical Information Retrieval: Learning Textual Relevance from Click Logs," in BioNLP 2017, Vancouver, Canada, 2017, pp. 222-231.
B. Mitra and N. Craswell, "Neural Models for Information Retrieval," ArXiv, vol. abs/1705.01509, 2017.
Y. Zhang, et al., "Neural Information Retrieval: A Literature Review," ArXiv, vol. abs/1611.06792, 2016.
J. Guo, et al., "A Deep Relevance Matching Model for Ad-hoc Retrieval," Proceedings of the 25th ACM International on Conference on Information and Knowledge Management, 2016.
S. Zhao, et al., "Graphene: A Precise Biomedical Literature Retrieval Engine with Graph Augmented Deep Learning and External Knowledge Empowerment," Proceedings of the 28th ACM International Conference on Information and Knowledge Management, 2019.
J. Guo, et al., "A Deep Look into Neural Ranking Models for Information Retrieval," ArXiv, vol. abs/1903.06902, 2019.
A. Allot, et al., "LitSense: making sense of biomedical literature at sentence level," Nucleic Acids Res, vol. 47, pp. W594-W599, Jul. 2, 2019.
S. Mohan, et al., "A Fast Deep Learning Model for Textual Relevance in Biomedical Information Retrieval," arXiv:1802.10078 [cs], Feb. 26, 2018 2018.
B. Hu, et al., "Convolutional Neural Network Architectures for Matching Natural Language Sentences," arXiv:1503.03244 [cs], Mar. 11, 2015 2015.
Z. Lu and H. Li, "A deep architecture for matching short texts," 2013, pp. 1367-1375.
Z. Lu, "PubMed and beyond: a survey of web tools for searching biomedical literature," Database (Oxford), vol. 2011, p. baq036, 2011.
S. Robertson and H. Zaragoza, "The Probabilistic Relevance Framework: BM25 and Beyond," Foundations and Trends in Information Retrieval, vol. 3, pp. 333-389, 2009.
A. Trotman, et al., "Improvements to BM25 and Language Models Examined," presented at the Proceedings of the 2014 Australasian Document Computing Symposium, Melbourne, VIC, Australia, 2014.
Y. Lv and C. Zhai, When documents are very long, BM25 fails!, 2011.
N. Fiorini, et al., "How user intelligence is improving PubMed," Nature Biotechnology, vol. 36, pp. 937-945, Nov. 1, 2018 2018.
J. Lin and W. J. Wilbur, "Modeling Actions of PubMed Users with N-Gram Language Models," Inf Retr Boston, vol. 12, pp. 487-503, Sep. 12, 2008.
N. Fiorini, et al., "Best Match: New relevance search for PubMed," PLOS Biology, vol. 16, p. e2005343, 2018.
T. Liu, "Learning to rank for information retrieval," in SIGIR '10, 2010.
C. Burges, et al., "Learning to Rank Using an Ensemble of Lambda-Gradient Models," in Yahoo! Learning to Rank Challenge, 2011. pp. 25-35.
C. Burges, et al., "Learning to rank using gradient descent," in the 22nd international conference, 2005, pp. 89-96.
N. Fiorini, et al., "Towards PubMed 2.0," eLife, vol. 6.
N. Fiorini, et al., "PubMed Labs: an experimental system for improving biomedical literature search," Database: The Journal of Biological Databases and Curation, vol. 2018, Sep. 18, 2018 2018.
A. Parikh, et al., "A Decomposable Attention Model for Natural Language Inference," Proceedings of the 2016 Conference on Empirical Methods in Natural Language Processing, pp. 2249-2255, 2016.
F. Khani, et al., "Evidence for molecular differences in prostate cancer between African American and Caucasian men," Clin Cancer Res, vol. 20, pp. 4925-4934, Sep. 15, 2014.
S. E. Robertson, et al., "Okapi at TREC-3," 1996, pp. 109-126.
P. J. Cock, et al., "Biopython: freely available Python tools for computational molecular biology and bioinformatics," Bioinformatics, vol. 25, pp. 1422-1423, Jun. 1, 2009.
J. Devlin, et al., "BERT: Pre-training of Deep Bidirectional Transformers for Language Understanding," arXiv:1810.04805 [cs], May 24, 2019 2019.
A. P. Parikh, et al., "A Decomposable Attention Model for Natural Language Inference," arXiv:1606.01933 [cs], Sep. 25, 2016 2016.
D.-A. Clevert, et al., "Fast and Accurate Deep Network Learning by Exponential Linear Units (ELUs)," arXiv:1511.07289 [cs], Feb. 22, 2016 2016.
S. Ioffe and C. Szegedy, "Batch Normalization: Accelerating Deep Network Training by Reducing Internal Covariate Shift," arXiv:1502.03167 [cs], Mar. 2, 2015 2015.
D. P. Kingma and J. Ba, "Adam: A Method for Stochastic Optimization," arXiv:1412.6980 [cs], Jan. 29, 2017 2017.
Bojanowski, et al., "Enriching Word Vectors with Subword Information," Transactions of the Association for Computational Linguistics, vol. 5, pp. 135-146, 2017 2017.
F. Chollet and others, "Keras," 2015 2015.
M. Abadi, et al., "TensorFlow: Large-Scale Machine Learning on Heterogeneous Distributed Systems," arXiv:1603.04467 [cs], Mar. 16, 2016 2016.
Islamaj Dogan, et al., "Understanding PubMed user search behavior through log analysis," Database (Oxford), vol. 2009, p. bap018, 2009.
A. S. M. Mosa and I. Yoo, "A Study on Pubmed Search Tag Usage Pattern: Association Rule Mining of a Full-day Pubmed Query Log," BMC Medical Informatics and Decision Making, vol. 13, p. 8, Jan. 9, 2013 2013.
J. R. Herskovic, et al., "A Day in the Life of PubMed: Analysis of a Typical Day's Query Log," Journal of the American Medical Informatics Association : JAMIA, vol. 14, pp. 212-220, 2007 2007.

\* cited by examiner

|  |  | MBM |
|---|---|---|
| Sentences |  | 95,230 |
| Citations |  | 100,102 |
| Ranks of Cited Articles in Query Returns | Top 1,000 | 100,102 |
|  | Top 100 | 68,804 |
|  | Top 20 | 48,979 |
|  | Top 1 | 18,737 |

*FIG. 4E*

|  |  | MBM | PubMed TFIDF |
|---|---|---|---|
| Sentences |  | 60,600 | |
| Citations |  | 62,818 | |
| Ranks of Cited Articles in Query Returns | Top 1,000 | 62,818 | |
|  | Top 100 | 49,872 | 40,411 |
|  | Top 20 | 38,663 | 27,253 |
|  | Top 1 | 16,486 | 9,325 |

*FIG. 4F*

|  |  | MBM | PubMed_TFIDF | PubMed_BM |
|---|---|---|---|---|
| Sentences |  | 10,790 | | |
| Citations |  | 11,145 | | |
| Ranks of Cited Articles in Query Returns | Top 1,000 | 11,145 | | |
|  | Top 100 | 9,394 | 8,156 | 6,841 |
|  | Top 20 | 7,642 | 5,956 | 4,249 |
|  | Top 1 | 3,613 | 2,249 | 448 |

*FIG. 4G*

| Category | Search Rank | Model Rank | SEN PMID | Sentence (SEN) | ABS PMID | Cited Article's Title (ABS) |
|---|---|---|---|---|---|---|
| A-1 | not found | 201 | 29739739 | Use of K-SRS assessment research (n=13) was done to study system effectiveness, feasibility, accuracy, or reliability. | 25884838 | Instrumenting Gait Assessment Using the Kinect in People Living With Stroke: Reliability and Association With Balance Tests |
| A-2 | not found | 711 | 28381227 | All but one study (examining elderly) reported overweight/obesity to be associated with lower levels of individual education | 24133894 | Association Between Obesity and Symptoms of Depression of Adults in Puerto Rico |

FIG. 4H

| | | | | | | |
|---|---|---|---|---|---|---|
| B-1 | not found | 1 | 27135338 | Put and Spd are essential for life, as Arabidopsis mutants defective in their biosynthetic pathways are embryo-lethal, whereas Spm and T-Spm have been specifically linked to stress responses and development, respectively. | 18594857 | Polyamines: Essential Factors for Growth and Survival |
| B-2 | not found | 10 | 27382330 | These are the main mechanisms leading to a prolongation of action of aminosteroid NMBAs. | 1677546 | Distribution, Elimination, and Action of Vecuronium in the Elderly |
| C | 1 | 290 | 28321231 | Proline accumulation is considered to be a plant adaptive response to high salinity and drought stresses. | 21400017 | Drought-induced Proline Accumulation Is Uninvolved With Increased Nitric Oxide, Which Alleviates Drought Stress by Decreasing Transpiration in Rice |
| D-1 | 891 | 1 | 19590675 | The prevalence of African women who habitually use Hg-containing cosmetic products is not known; however, surveys in certain populations suggest that the use of these cosmetic products is quite variable, ranging from 10% in a study of Senegalese women to 47% in a population of male and female Nigerian traders. | 12081345 | An epidemiological survey of the use of cosmetic skin lightening cosmetics among traders in Lagos, Nigeria. |
| D-2 | 296 | 4 | 29142642 | As having a hydrophobic methacrylate terminal end and a hydrophilic phosphate terminal end, copolymerizing resin monomers and chemically binds to oxides, respectively, MDP has a bifunctional adhesive monomer that can bind to zirconia or metal. | 16193486 | Bonding of Dual-Cured Resin Cement to Zirconia Ceramic Using Phosphate Acid Ester Monomer and Zirconate Coupler |
| D-3 | 288 | 4 | 19847088 | Similarly all the three patients in the study by Holmang et al with focal LELC died of the disease (9-68 months), compared to none of the six patients with pure or predominant LELC (13 months to 18 years) | 9474147 | Bladder Carcinoma With Lymphoepithelioma-Like Differentiation: A Report of 9 Cases |

*FIG. 4H - Continued*

| | | | | | | |
|---|---|---|---|---|---|---|
| D-4 | 680 | 14 | 27435901 | Hydrophobic interactions are commonly described, but since cognate domains are selective to their partner PCP(s), further interactions, such as variable charge distribution,20 must also play important roles in recognition. | 25050442 | The Crystal Structure of BlmI as a Model for Nonribosomal Peptide Synthetase Peptidyl Carrier Proteins |
| D-5 | 665 | 6 | 23698162 | There is general agreement that increasing dietary SFA intake, especially in overweight or obese individuals, is associated with raised inflammatory markers, predominately by activating the toll-like receptor 4 (TLR4) pathway. | 22133051 | Dietary Factors and Low-Grade Inflammation in Relation to Overweight and Obesity |
| D-6 | 192 | 4 | 29593498 | The subventricular zone (SVZ) is a prime neuropoietic niche of the brain responsible for the postnatal neurogenesis in the telencephalon. | 10380923 | Subventricular Zone Astrocytes Are Neural Stem Cells in the Adult Mammalian Brain |
| D-7 | 158 | 3 | 29376513 | Especially educational measures, community based measures as well as legislative measures were set up to reduce injuries in the young population. | 9346041 | Can We Prevent Accidental Injury to Adolescents? A Systematic Review of the Evidence |
| D-8 | 863 | 5 | 26035426 | The size of mtDNA nucleoids is debated in the literature (although recent evidence from high-resolution microscopy suggests that nucleoid size is generally <2, consonant with recent evidence that individual nucleoids may be homoplasmic); our model allows for inheritance of homoplasmic or heteroplasmic nucleoids of arbitrary characteristic size c, thus allowing for a range of sub-organellar mtDNA structure. | 23721879 | mtDNA makes a U-turn for the mitochondrial nucleoid. |
| D-9 | 961 | 8 | 23176133 | A modified Borg scale of perceived exertion will be used to regulate the intensity of resistance exercise. | 7154893 | Psychophysical bases of perceived exertion. |

FIG. 4H - Continued

| Metric | Query | | Question | | Narrative | |
|---|---|---|---|---|---|---|
| | BM25 | DeepSense | BM25 | DeepSense | BM25 | DeepSense |
| P_5 | 0.7600 | 0.6560 | 0.7400 | 0.6400 | 0.5800 | 0.4640 |
| P_10 | 0.7280 | 0.6360 | 0.7020 | 0.6260 | 0.5520 | 0.4600 |
| P_15 | 0.6880 | 0.6133 | 0.6760 | 0.6227 | 0.5533 | 0.4733 |
| P_20 | 0.6800 | 0.6040 | 0.6560 | 0.6360 | 0.5230 | 0.4730 |
| P_30 | 0.6573 | 0.5967 | 0.6380 | 0.6233 | 0.4987 | 0.4627 |
| P_100 | 0.5344 | 0.5344 | 0.5472 | 0.5472 | 0.4002 | 0.4002 |

FIG. 4I

MACHINE LEARNING-BASED LITERATURE SEARCH AND RETRIEVAL AND RELATED MACHINE LEARNING MODEL TRAINING METHODS

CROSS-REFERENCE TO RELATED APPLICATIONS

This application claims the benefit of U.S. provisional patent application No. 63/401,774 filed on Aug. 29, 2022, and titled "MACHINE LEARNING-BASED LITERATURE SEARCH AND RETRIEVAL AND RELATED MACHINE LEARNING MODEL TRAINING METHODS," the disclosure of which is expressly incorporated herein by reference in its entirety.

GOVERNMENT SUPPORT

This invention was made with government support under grant No. R01GM126558 awarded by the National Institutes of Health. The government has certain rights in the invention.

BACKGROUND

Search engines for literature generally are adapted for short queries that are not in natural language. Full-sentence natural language queries can include more information than shorter queries (e.g., keywords). But full sentence natural language queries require different techniques than keyword-based queries. Therefore, what is needed are system and methods for training machine learning models to perform natural language searches for relevant literature, including data profiling on large datasets, including systems and methods for performing data profiling on datasets including large numbers of tables.

SUMMARY

In some aspects, the techniques described herein relate to a computer-implemented method of training a machine learning model configured for literature retrieval, the method including: receiving a plurality of full-text articles; extracting, from the plurality of full-text articles, a plurality of positive sentence-citation pairs, each positive sentence-citation pair including a respective citing sentence and at least one cited article that is associated with the respective citing sentence; creating a labeled dataset including the plurality of positive sentence-citation pairs; and training a machine learning model using the labeled dataset.

In some aspects, the techniques described herein relate to a computer-implemented method, wherein the step of creating the labeled dataset further includes: generating a plurality of negative sentence-citation pairs, each negative sentence-citation pair including a respective citing sentence and at least one cited article that is not associated with the respective citing sentence; and adding the negative sentence-citation pairs to the labeled dataset.

In some aspects, the techniques described herein relate to a computer-implemented method, wherein the at least one cited article that is not associated with the respective citing sentence is randomly selected.

In some aspects, the techniques described herein relate to a computer-implemented method, wherein the machine learning model is a deep learning model.

In some aspects, the techniques described herein relate to a computer-implemented method, wherein the deep learning model includes an artificial neural network.

In some aspects, the techniques described herein relate to a computer-implemented method, wherein the deep learning model is a decomposable attention model.

In some aspects, the techniques described herein relate to a computer-implemented method, wherein the plurality of full-text articles are received from a digital literature archive.

In some aspects, the techniques described herein relate to a method for retrieving literature from an archive, the method including: receiving a query including a sentence; inputting the query into a machine learning model trained; and receiving, from the machine learning model, a response to the query, wherein the response identifies a full-text article.

In some aspects, the techniques described herein relate to a method, further including providing the machine learning model trained.

In some aspects, the techniques described herein relate to a method, wherein the step of creating the labeled dataset further includes: generating a plurality of negative sentence-citation pairs, each negative sentence-citation pair including a respective citing sentence and at least one cited article that is not associated with the respective citing sentence; and adding the negative sentence-citation pairs to the labeled dataset.

In some aspects, the techniques described herein relate to a method, wherein the at least one cited article that is not associated with the respective citing sentence is randomly selected.

In some aspects, the techniques described herein relate to a method, wherein the machine learning model is a deep learning model.

In some aspects, the techniques described herein relate to a method, wherein the deep learning model includes an artificial neural network.

In some aspects, the techniques described herein relate to a method wherein the deep learning model is a decomposable attention model.

In some aspects, the techniques described herein relate to a method, wherein the plurality of full-text articles are received from a digital literature archive.

In some aspects, the techniques described herein relate to a computer-implemented method for providing ranked responses to a query, the method including: receiving a query including a sentence; inputting the query into a search engine; obtaining a plurality 1.

In some aspects, the techniques described herein relate to a computer-implemented method, wherein the machine learning model is a deep learning model.

In some aspects, the techniques described herein relate to a computer-implemented method, further including providing a machine learning model trained.

In some aspects, the techniques described herein relate to a computer-implemented method, wherein the step of creating the labeled dataset further includes: generating a plurality of negative sentence-citation pairs, each negative sentence-citation pair including a respective citing sentence and at least one cited article that is not associated with the respective citing sentence; and adding the negative sentence-citation pairs to the labeled dataset.

In some aspects, the techniques described herein relate to a computer-implemented method, wherein the plurality of full-text articles are received from a digital literature archive.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 4A illustrates the performance of an example implementation and MBM (a modified BM25 algorithm) on a first example dataset. FIG. 4B illustrates performance of an example implementation, MBM and (PubMed TF-IDF) on a second example dataset. FIG. 4C illustrates performance of an example implementation, MBM, PMT and PMB on a third example dataset. FIG. 4D illustrates the performance of an implementation of the present disclosure, and MBM, PMT PMB (PubMed BestMatch) and Google Scholar on 100 sentences randomly selected from an example dataset. Top1: the relevant article is ranked as top 1 of the search result; top 20: the relevant article is ranked within the top 20 of the search result; and top 100: the relevant article is ranked within the top 100 of the search result.

FIG. 4E illustrates a summary of a large test dataset "D1" used to test an implementation of the present disclosure.

FIG. 4F illustrates a summary of a medium test dataset "D2" used to test an implementation of the present disclosure.

FIG. 4G illustrates a summary of a small test dataset "D3" used to test an implementation of the present disclosure.

FIG. 4H illustrates a table of results from a study of an example implementation of the present disclosure.

FIG. 4I illustrates a table comparing BM25 vs. an example implementation of the present disclosure for the top 100 BM25 Returns.

DETAILED DESCRIPTION

Figure 1A:
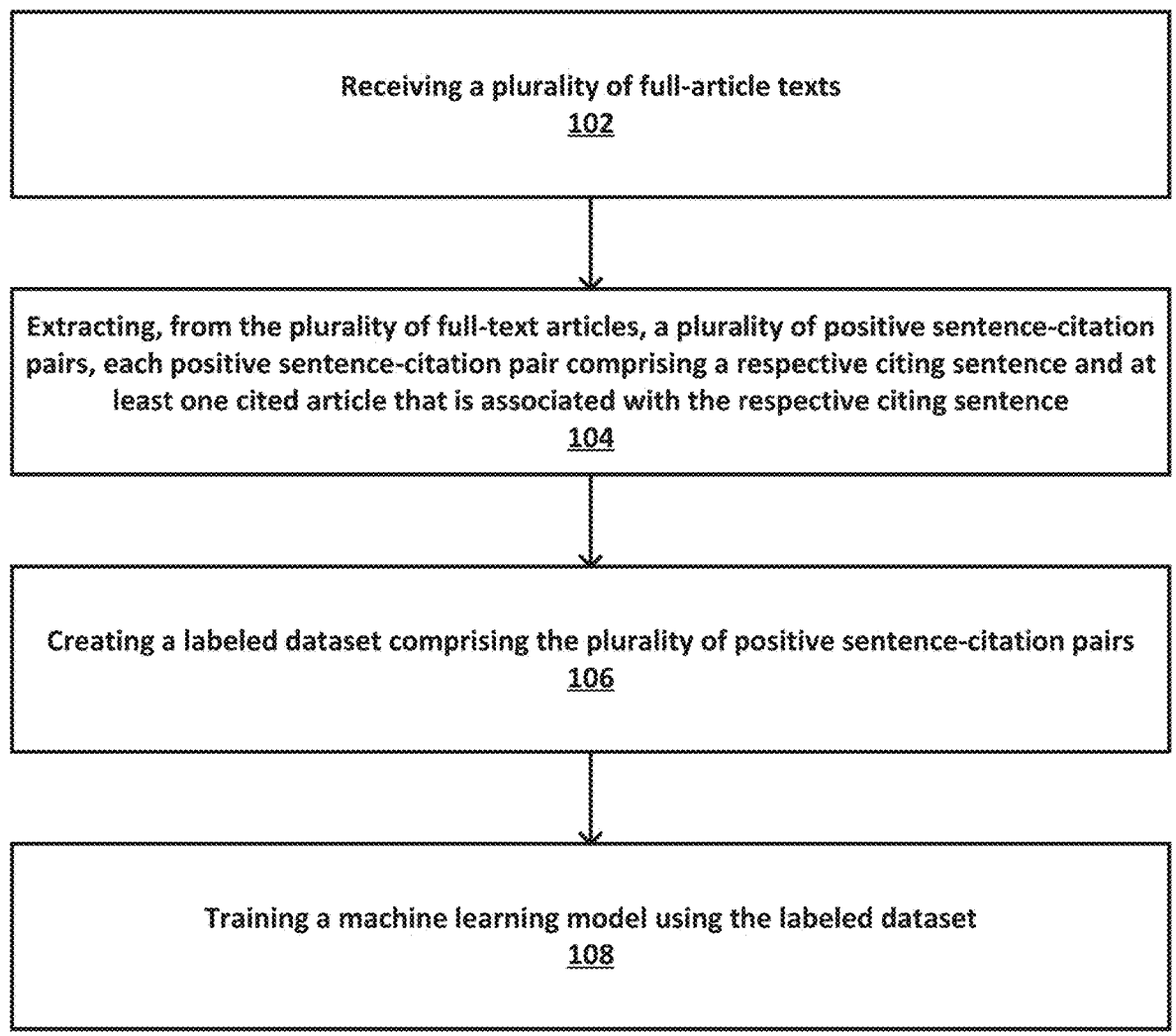
FIG. 1A is a flowchart illustrating a method of training a machine learning model to search literature, according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for performing searches of academic literature, it will become evident to those skilled in the art that the implementations are not limited thereto, but are applicable for searching any type of text database.

The term "artificial intelligence" is defined herein to include any technique that enables one or more computing devices or comping systems (i.e., a machine) to mimic human intelligence. Artificial intelligence (AI) includes, but is not limited to, knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders. The term "deep learning" is defined herein to be a subset of machine learning that that enables a machine to automatically discover representations needed for feature detection, prediction, classification, etc. using layers of processing. Deep learning techniques include, but are not limited to, artificial neural network or multilayer perceptron (MLP).

Machine learning models include supervised, semi-supervised, and unsupervised learning models. In a supervised learning model, the model learns a function that maps an input (also known as feature or features) to an output (also known as target or targets) during training with a labeled data set (or dataset). In an unsupervised learning model, the model learns patterns (e.g., structure, distribution, etc.) within an unlabeled data set. In a semi-supervised model, the model learns a function that maps an input (also known as feature or features) to an output (also known as target or target) during training with both labeled and unlabeled data.

An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, output layer, and optionally one or more hidden layers. An ANN having hidden layers can be referred to as deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tan H, or rectified linear unit (ReLU) function), and provide an output in accordance with the activation function.

Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include, but are not limited to, backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

With reference to FIG. 1A, implementations of the present disclosure include methods of training a machine learning model configured to perform literature search and retrieval. FIG. 1A illustrates an example implementation of a method 100 according to the present disclosure. Implementations of the present disclosure can overcome limitations of conventional deep learning models. As an example, when training a machine learning model to rank search results for literature, it can require a prohibitive amount of computing power to train the model directly on all abstracts in the database or all abstracts for a certain query. Implementations of the present disclosure can train a deep learning model using a subset of the abstracts in the database. Implementations of the present disclosure can query the database and select only a subset of the results (e.g., the top 1,000 results, as described below). Implementations of the present disclosure can generate a training and validation dataset using the subset of the results, for example by obtaining a negative cases for each sentence query, where at least one negative case is randomly selected and at least one negative case is selected from a ranked list of query results. Thus, implementations of the present disclosure allow for the efficient application of machine learning methods to databases. The trained machine learning models using these methods can be used to improve searching and sorting of literature, including by increasing the accuracy and effectiveness of longer sentence queries when compared to conventional keyword queries.

The machine learning model trained in the method 100 can be any kind of machine learning model or combinations of machine learning models. A non-limiting example of a type of machine learning model that can be used is deep learning models. Non-limiting examples of deep learning models include artificial neural networks and decomposable attention models.

The method 100 can include receiving at step 102 a plurality of full-text articles. In some implementations of the present disclosure, the full text articles can include academic articles with citations or footnotes that correspond to the sources of the information in the full text article. The full text articles that are received at step 102 can be from a digital literature archive. Non-limiting examples of digital literature archives are PubMed Central (PMC) and Google Scholar.

The method 100 can further include extracting at step 104, from the plurality of full-text articles, a plurality of positive sentence-citation pairs. Each of the positive sentence-citation pairs can include a respective citing sentence and at least one cited article that is associated with the respective citing sentence.

The method 100 can further include creating at step 106 a labeled dataset that includes the plurality of positive sentence-citation pairs. In some implementations of the present disclosure, the labeled data set at step 106 can further include generating a plurality of negative sentence-citation pairs. The negative sentence-citation pairs can each include a respective citing sentence and at least one cited article that is not associated with the respective citing sentence. The negative sentence-citation pairs can be added to the labeled dataset so that the labeled dataset such that the labeled dataset includes a plurality of both positive sentence-citation pairs and negative sentence-citation pairs. The articles that are not associated with the respective citing sentences can be randomly selected articles.

At step 108, a machine learning model can be trained based on the labeled dataset. As described herein, machine learning model training algorithms tune the model to minimize or maximize an objective function. This disclosure contemplates that an appropriate known training algorithm can be selected for the type of machine learning model.

Implementations of the present disclosure also include methods for retrieving literature from an archive. The methods can include receiving a query. The query can, in some implementations, be a full text sentence. The query can be input into the machine learning model trained by any or all of the steps shown and described with reference to FIG. 1A.

The method for retrieving literature from the archive can also include receiving, from the machine learning model, a response to the query, where the response identifies a full-text article. The method can also include providing the trained machine learning model as a response to the query.

Figure 1B:
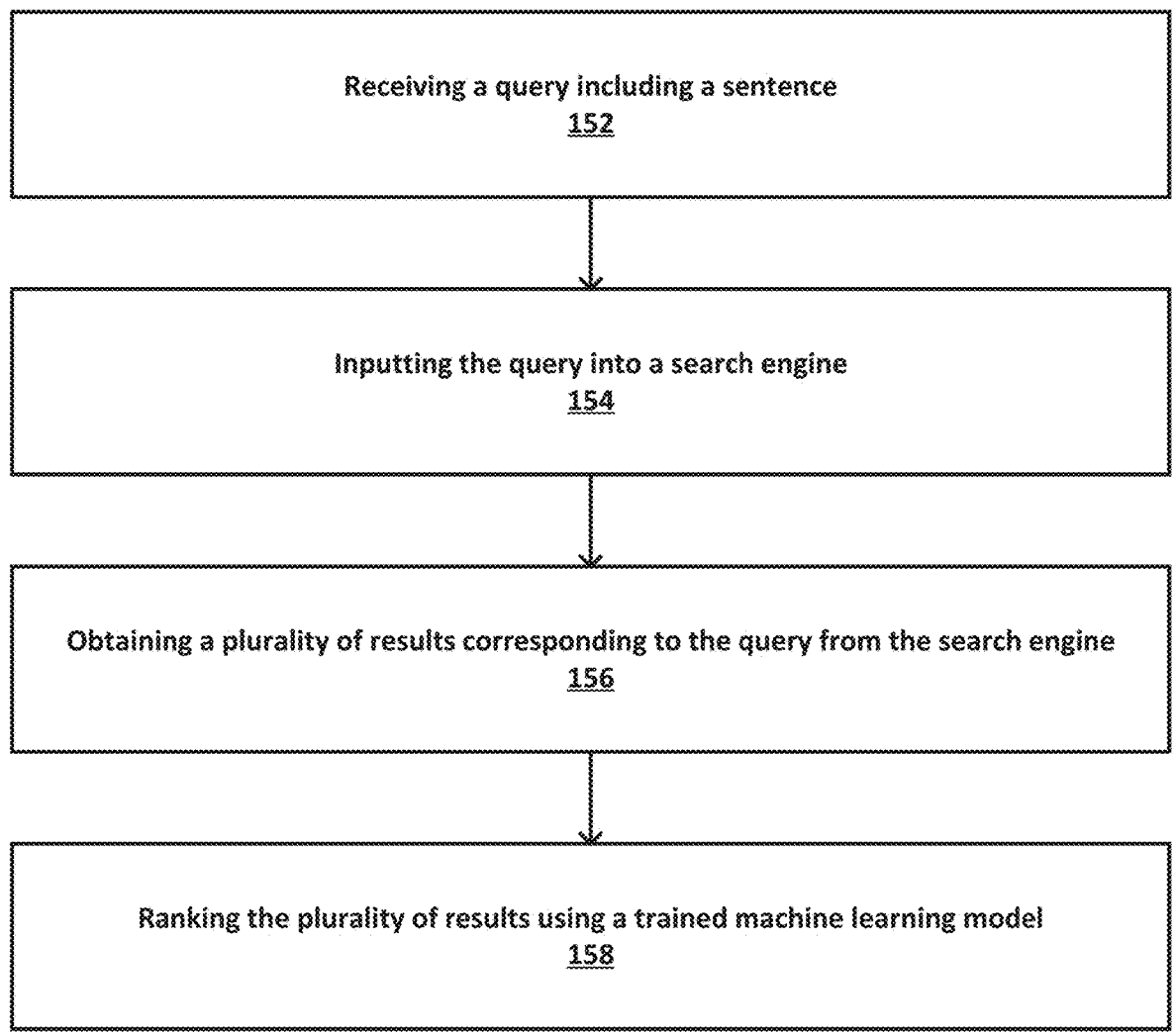
FIG. 1B is a flowchart illustrating a method of providing ranked responses to a query, according to implementations described herein.

With reference to FIG. 1B, implementations of the present disclosure include methods of ranking responses to a query using the trained machine learning models described herein. For example, the machine learning model used in FIG. 1B can be a model trained according to FIG. 1A. An example method 150 of ranking query results is shown in FIG. 1B. At step 152, the method 150 can include receiving a query including a sentence. The trained machine learning models used to perform the method 150 can be trained according to any of the methods described with respect to FIG. 1A.

At step 154, the method 150 can include inputting the query into a search engine.

At step 156, the method 150 can include obtaining search results from the search engine. If the results from the search engine are provided in a rank order, the results can be "re-ranked" as described with respect to the example implementation below.

At step 158, the method 150 can further include ranking, using the trained machine learning model, the results. Optionally, optionally, the search results are provided to the trained machine learning model in a rank order, and the trained machine learning model the results can be outputted to a user in the order ranked by the trained machine learning model.

Figure 2:
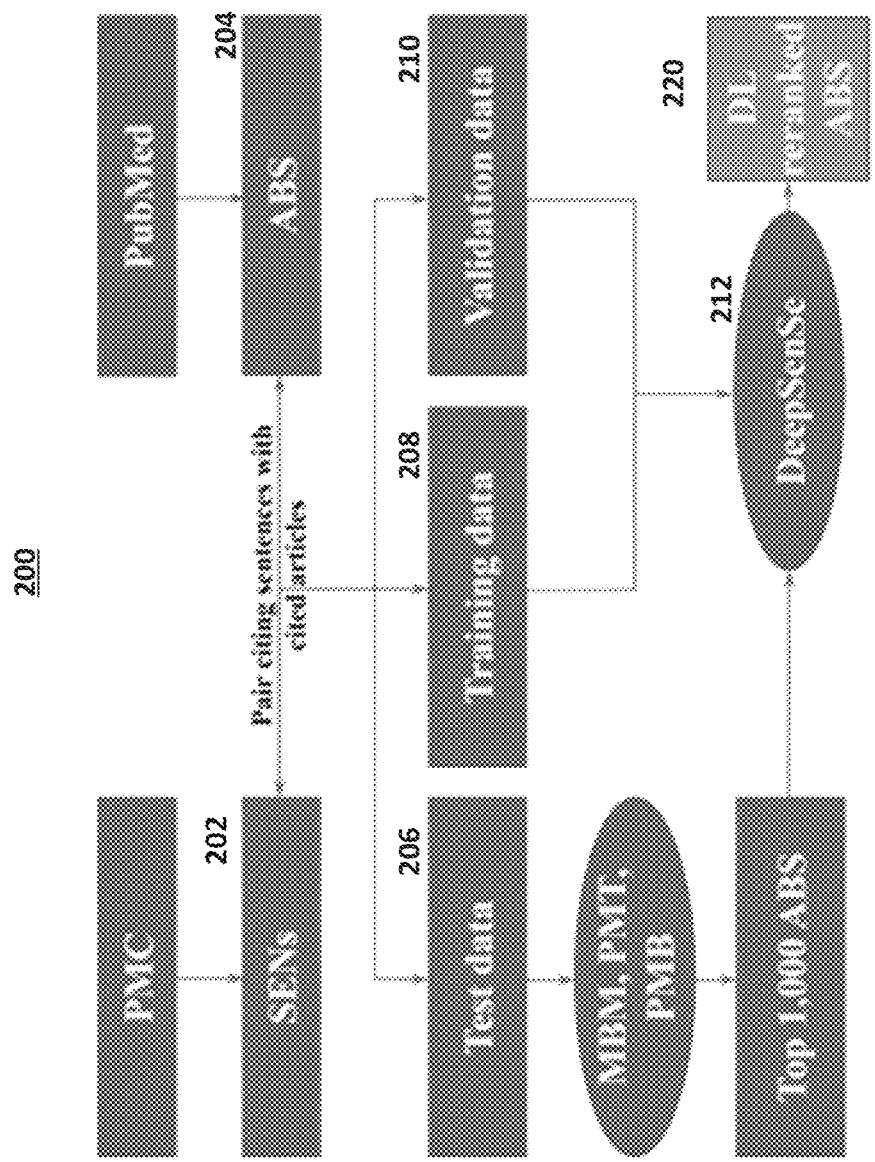
FIG. 2 is a workflow diagram, according to implementations described herein.

With reference to FIG. 2, a block diagram 200 of an example workflow for training a machine learning model is shown. The workflow handles both sentences 202 and articles 204. The articles 204 can include any information from the entire full-text article, or a subset of the information from the article (e.g., the title and abstract). The sentences 202 and articles 204 can be paired to generate test data 206, training data 208, and/or validation data 210. The training data 208 and validation data 210 can be inputs used to train and validate the machine learning model 212, for example by using the method 100 described with reference to FIG. 1A. The trained machine learning model 212 shown in FIG. 2 is a deep learning model.

As shown in FIG. 2, training data 208 and validation data 210 includes a plurality of positive and negative sentence-citation pairs (see e.g., step 106 of FIG. 1A). For example, the labeled dataset described with regard to FIG. 1A can be partitioned into a training and validation datasets (e.g., 80%/20% train/validation split). On the other hand, the test data 206 is created by querying the citing sentences against full-text abstracts as described herein. As result, the test data 206 includes samples different than those used for training. The test data 206 is used to measure the performance of the trained machine learning model 212 and/or to compare the trained model's performance to other methods. The trained machine learning model 212 trained as described herein can be queried to output a ranked list of relevant articles 220. In other words, the trained machine learning model 212 can be operated in inference mode.

Figure 3:
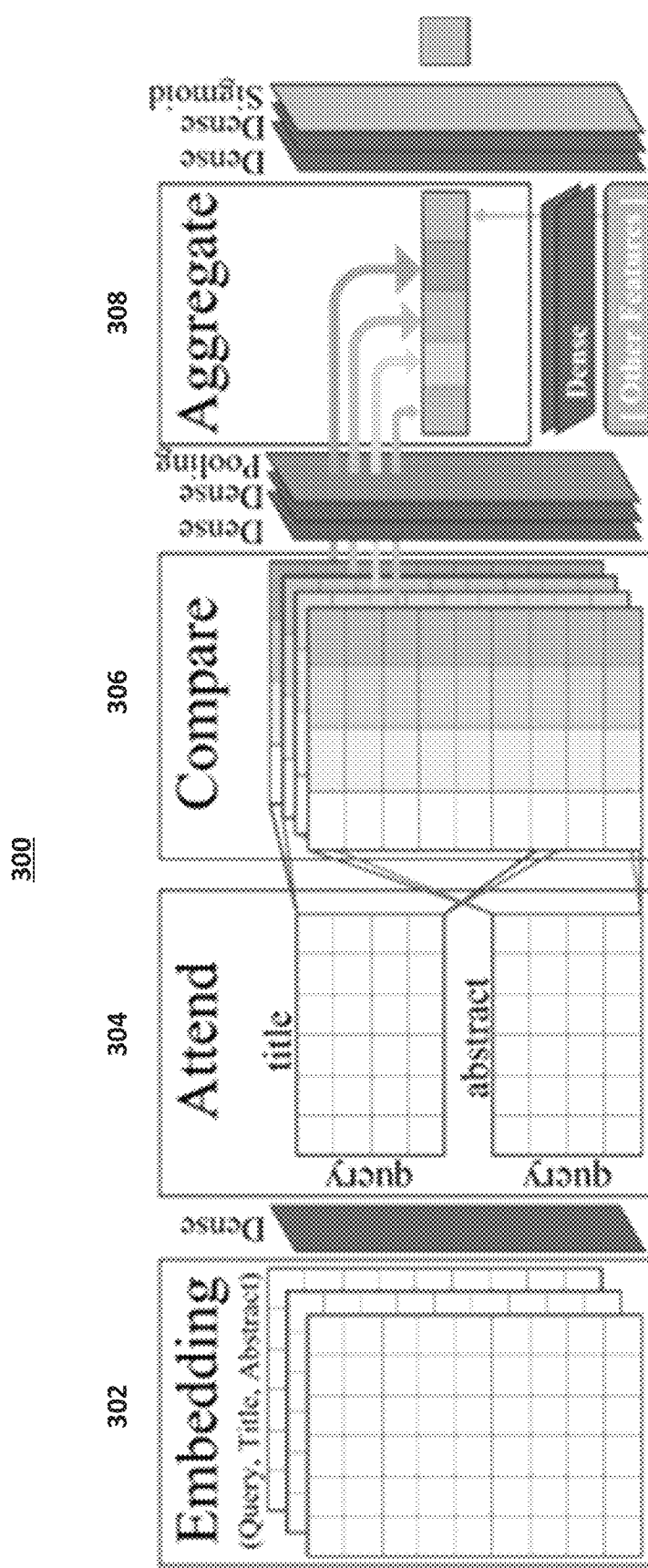
FIG. 3 illustrates a decomposable attention model, according to implementations described herein

With reference to FIG. 3, an example deep learning model 300 is shown. The deep learning model 300 can be used in the implementations of the present disclosure. For example, the trained machine learning model 212 shown in FIG. 2 can be implemented using the deep learning model 300. The deep learning model 300 is a decomposable attention model. The core architecture of a decomposable attention model includes steps of attending, comparing, and aggregating, which are described below. It should be understood that the decomposable attention model architecture of FIG. 3 is provided only as an example. Additionally, it should be understood that a decomposable attention model is provided only as an example deep learning model and that this disclosure contemplates using other types of supervised machine learning models, including but not limited to artificial neural networks, in the present disclosure.

Still with reference to FIG. 3, the deep learning model 300 can include performing word embedding 302. Embedding maps inputs from high-dimensional to low-dimensional space. The word embedding 302 can be performed using a database of text similar to the text that the model will be trained on. For example, a model configured to search for articles the medical literature can perform word embedding 302 based on articles in the medical literature.

The deep learning model can also include attending 304. Attending 304 can align tokens (e.g., words) in one sequence with tokens in another sequence to output a set of attention weights. Example attending steps are described in the Example below, e.g., with regard to Equations (1)-(6).

The deep learning model can further include comparing 306. Comparing can compare the attention weights output by the attending 304 step with each other. Example comparing steps are described in the Example below, e.g., with regard to Equations (7)-(10).

The deep learning model can also include aggregating 308. Aggregating 308 can predict a logical relationship between different tokens in a sequence based on the output of the comparing 306 step. Example aggregating steps are described in the Example below, e.g., with regard to Equations (11)-(15).

Example

An example implementation of the present disclosure was tested on medical literature queries. Most queries submitted to a literature search engine can be more precisely written as sentences to give the search engine more specific information. Sentence queries can be more effective, in principle, than short queries with small numbers of keywords. Querying with full sentences is also a step in question-answering and citation recommendation systems. Natural language processing (NLP) can fail to provide satisfactory results to sentence queries. The example implementation described herein includes a deep learning-based method for sentence queries, referred to herein as "DeepSenSe," using citation data available in full-text articles obtained from PubMed Central (PMC). A large amount of labeled data was generated from millions of matched citing sentences and cited articles, making it possible to train quality predictive models using modern deep learning techniques. A two-stage approach was designed: in the first stage the example implementation used a modified BM25 algorithm to obtain the top 1000 relevant articles; the second stage involved re-ranking the relevant articles using DeepSenSe. The study tested the example implementation using a large number of sentences extracted from real scientific articles in PMC. The example implementation method performed better than PubMed and Google Scholar for sentence queries.

Literature retrieval using search engines is performed by biomedical scientists to find academic papers (related to a set of keywords) they are interested in. Public search engines, such as PubMed and Google Scholar, have been commonly used for this purpose. The ever-increasing number of biomedical research articles published every year has made it very challenging for search engines to rank the most relevant articles highly enough for users to find them. Missing important studies in a literature search can have serious consequences when designing a new study, such as wasting resources and/or time; it can also result in making wrong conclusions or missing new discoveries when interpreting experimental results.

Search engines for scientific literature retrieval in particular is important. [1-17]. Web-based tools have also been developed so that researchers can conduct a literature search from various databases [18]. Most search engines use BM25 (or a variation of it) for its similarity ranking algorithm [19]. BM25 is a bag-of-words retrieval function that ranks a set of documents based on the number of query terms appearing in each document, regardless of their proximity within the document. A number of variations [20] have been proposed to address the known issues of BM25 [21]. User activity information has also been leveraged to improve users' search experience [22-24]. In 2017, a new relevance search algorithm called "Best Match" was deployed at PubMed [24] using a "learn to rank" based machine learning algorithm [25-27] trained by user-click information from PubMed search logs. PubMed has been the major literature search tool for biomedical scientists around the world with more than 3 million visits per day [28, 29].

When searching for papers related to a particular topic of interest, it can be more effective to search with more keywords that define a topic, such as using full sentences or asking questions. However, current search engines do not perform well for such query types (see Results for more details). For example, PubMed often does not return any results for sentence queries. The example implementation includes a better method for document retrieval using sentence queries by taking advantage of recent advancements in deep learning algorithms for natural language processing (NLP). Methods that use sentence queries for document retrieval will also help the development of more accurate question-answering and citation recommendation systems.

A major challenge when developing a quality search engine using machine learning methods is the availability of a large amount of labeled training data. The labeled data should consist of different queries matched to relevant papers. Generating such labeled data manually is very time and resource consuming. The example implementation used the citation data from PubMed Central (PMC) full-text articles to generate labeled data. In full-text articles, when a sentence cited an article, it is referred to herein as the "citing sentence" and the article as a "cited article." The citing sentence and cited article can be considered as a manually labeled case with the citing sentence as the query and the cited article as the relevant document. The example implementation can extract citing sentences and the corresponding cited articles from PMC full-text articles to generate millions of labeled cases, which can be used to train quality deep learning models.

The example implementation can include different deep learning architectures, which can present different trade-offs between accuracy and speed. In the implementation described herein, the decomposable attention model [30] was used. The example implementation used a two-step approach, where in the first step a modified BM25 method was used to rank all the articles to generate the top 1000 relevant articles; then the articles were re-ranked in the second step using deep learning models to produce the final ranking.

The study tested the performance of the example implementation using a large number of cases obtained from the PMC citation data, which were not used for model training. The example implementation achieved significantly better performance than the search engines of PubMed and Google Scholar.

The example implementation can find the most relevant articles associated with a sentence query from a database of articles. To use the latest deep learning methods, the example implementation can include a substantial amount of labeled training data. To that end, the example implementation can assume that the articles cited by a sentence in a scientific article are highly relevant to that sentence. Based on this assumption, the example implementation can download full-text articles from PubMed Central (PMC) and MEDLINE citations from PubMed. The example implementation can extract sentences with citations from the full-text part of the PMC XML files, and obtained titles, abstracts, publication year, article type (journal article, review, case reports, etc.) and journal names from the MEDLINE citations to build an internal database. This internal database can be queried to generate the training data. In addition, journal citation reports can be downloaded (e.g., from Web of Science [31]) and extracted the impact factors as one of the input features. The example implementation also extracted citation information from PubMed XML files and calculated the number of citations an article has for as many articles as possible. For each citing sentence and the cited article associated with it, The example implementation created a sentence-article pair (SEN, ABS) as a true case, where ABS contains both the title and abstract of the cited article as well as additional information related to the cited article.

Applying a deep learning model directly to all the PubMed abstracts for a given query can present feasibility challenges due to the relatively high computational cost of deep learning models. To address this challenge, the example implementation can include an SQL database of all the PubMed abstracts and used a modified BM25 algorithm [19] (called MBM) to query the top 1000 ranked articles, which are then re-ranked by the chosen deep learning model. When generating the training and validation dataset, the example implementation can obtain two negative cases for each sentence query: one case was randomly chosen from the top 1,000 query results excluding the cited article, and the other case was randomly chosen from all the abstracts outside of the top 1000. This strategy allows the model to learn the general differences between the true and false cases and the subtle differences between the true and high-ranking false cases. When performing a sentence query, only articles published earlier than the article containing the citing sentence (SEN) were considered because SEN can cite only earlier articles. As described above, the example implementation used in the study is referred to herein as "DeepSenSe" (Deep learning method using Sentence in Searches), but it should be understood that DeepSenSe is only a non-limiting example implementation.

The workflow of the methodology used in the example implementation is shown in FIG. 2. As used herein, "SENs" refers to citing sentences; "ABS" refers to titles and abstracts of cited articles; MBM refers to modified BM25 algorithm querying our database; PMT refers to PubMed TF-IDF algorithm querying PubMed database; PMB refers to PubMed "Best Match" algorithm querying PubMed database; and DL refers to deep learning.

As shown in FIG. 2, in the study citing sentences were extracted from PMC full-text articles and split into training, validation, and test data. PubMed articles were used to build the MBM database. Citing sentences were paired with cited PubMed articles. In the training and validation data, the sentence-citation pairs served as true cases. False cases were created by randomly sampling two articles not cited by the sentence for each citing sentence. For testing, the citing sentence was used as the query sentence while the cited article was considered as the most relevant article. The citing sentences were used as queries to search using MBM, PMT, and PMB to get the top 1000 results which were then re-ranked by DeepSenSe to obtain the final ranking results.

The example implementation included downloaded copies of PMC full-text articles published before Oct. 23, 2019. Sentences with citations were then extracted from the full-text. Sentences with no meaningful keywords were excluded. The remaining citing sentences were divided into training, validation, and test datasets. About 79% of citations are articles with a PubMed ID (PMID, a unique number for each article in PubMed); other citations are books, webpages, conferences, etc.

The example implementation stored and indexed the PubMed articles in a MySQL database, however it should be understood that the articles can be stored and/or indexed using any computing device (e.g., the system memory 504, removable storage 508, and/or non-removable storage 510 described with reference to FIG. 5). A modified BM25 algorithm (MBM) [32] was used in the study for querying articles from our own database [33]. The speed and accuracy of the example MBM were better than the example BM25 algorithm.

The query sentences were preprocessed using the NLTK (Natural Language Toolkit) package [34]. The sentences were first tokenized into words. Greek alphabets ($\alpha, \beta \ldots$ ) were converted into English words (alpha, beta, etc.). Stop words and punctuations were removed. The remaining tokens were rejoined with a space and used as the final query to the databases. When searching PubMed, the study added "OR" between each pair of consecutive words. This was used for PubMed to return results. In the study, sentences with less than 5 tokens or more than 50 tokens after preprocessing (tokenization, conversion of Greek alphabets, removal of stop words and punctuations) were excluded. For each sentence query, the study obtained the top 1000 relevant articles among all PubMed articles using MBM, PubMed TF-IDF (PMT) algorithm (the old PubMed algorithm before Best Match) or PubMed BestMatch (PMB) algorithm. Query sentences, whose corresponding cited articles have less than 50 words in their titles and abstracts, were excluded.

To develop the training and validation datasets, the query sentences were paired with their corresponding cited articles and these pairs served as positive cases. In addition, two negative cases were constructed for each citing sentence by pairing the citing sentence with two articles not cited by the sentence: one randomly selected from the top 1,000 search results of the citing sentence and another randomly selected from all other articles. In total, there are 854,101 sentences with 936,591 citations paired as positive cases and 1,870,387 negative cases in the training data. There are 145,455 sentences paired with 148,269 citations as positive cases and 296,128 citations as negative cases in the validation dataset.

Three test datasets were developed in the study to evaluate different methods. The test datasets were constructed by querying the citing sentences against all PubMed abstracts using MBM, PMT, or PMB. Biopython package [35] was used to query the PubMed database. The study included the first randomly selected 90,757 sentences whose cited articles are ranked in the top 1000 of search results by MBM. This test dataset is referred to as D1. More details on dataset D1 are shown in FIG. 4E.

The second test dataset (D2) includes cases for which the articles cited by the query sentences were all ranked in top 1000 by both MBM and PMT. The PubMed database implemented two relevance scoring algorithms: the TF-IDF algorithm has been used since 2013 and the "Best Match" algorithm, which is a L2R (learning to rank) machine learning algorithm, was deployed in 2017. Querying through the NCBI Entrez API gives results ranked by the TF-IDF algorithm while querying through the PubMed web portal gives results ranked by the "Best Match" algorithm. The study used the Biopython package [35] to query the PubMed database through the Entrez API to get search results ranked by the TF-IDF algorithm, and wrote a Python script to query the PubMed database through its web API to get search results ranked by the "Best Match" algorithm. Among the 90,757 citing sentences, 57,123 sentences had their corresponding cited articles ranked in the top 1,000 search results by both MBM and PMT. FIG. 4F shows more details on dataset D2.

Querying the PubMed database through its web API was much less efficient than through the Entrez API. The study obtained search results for 9,916 citing sentences for which the cited articles were ranked in the top 1,000 search results by MBM, PMT, and PMB. This dataset is referred to as dataset D3, illustrated in FIG. 4G.

To investigate the performance on sentence queries of Google Scholar, the study randomly selected 100 query sentences from D3. The sentences were used as queries to manually search on Google Scholar. In all the test datasets, the cited article of a query sentence is considered as the true relevant article for that sentence, and it was checked whether a search method ranked it in the top 1, 20, or 100 among all the 1,000 search results.

After experimenting with different deep learning models including BERT (Bidirectional Encoder Representations from Transformers) [36], the study found that the decomposable attention model [37] achieved the best tradeoff between accuracy and speed. The decomposable attention model is a simple neural architecture proposed by Parikh et al. for natural language inference. The core of the architecture consists of three steps: Attend, Compare, and Aggregate. To accommodate the characteristics of the search engine, a modified decomposable attention model was implemented in this work. Architecture of the modified decomposable attention model is shown in FIG. 3.

As a non-limiting example, at the training stage, the inputs are the quadruplets $\{(q,a,b,y)^n\}_{n=1}^N$, where q is the query sentence, a and b are the title and abstract of the cited article, and y is the label. At the evaluation stage, each query sentence was paired with each of the top returned articles. The triplet (q,a,b) was used as the input to the model that predicted the probability of relevance ranking for the returned article.

The example implementation further included embedding methods. Word embeddings with dimension d were used as representation of inputs. Let $q=(q_1, \ldots, q_{l_q})$ be the query sentence, $a=(a_1, \ldots, a_{l_a})$ and $b=(b_1, \ldots, b_{l_b})$ be the title and abstract of the cited article or returned article, respectively. $l_q$, $l_a$, $l_b$ are the lengths of the query sentence, the title, and the abstract of the article, respectively. $q_i$, $a_i$, $b_i \in \mathbb{R}^d$ are the $i^{th}$ word of the query sentence, the title, and the abstract of the article. The inputs are passed through a dense layer F with an exponential linear unit (ELU) [38] activation function and dropout. The resultant is then fed to subsequent steps of the model.

The example implementation further included an Attend step. At the Attend step, the example implementation can compute the unnormalized attention weights $e_{ij}^1$ for each element of the query sentence and the title, and for each element of the query sentence and the abstract.

$$e_{ij}^1 := F(q_i)^T F(a_j), i=1, \ldots, l_q, j=1, \ldots, l_a \quad (1)$$

$$e_{ij}^2 := F(q_i)^T F(b_j), i=1, \ldots, l_q, j=1, \ldots, l_b \quad (2)$$

Then the normalized attention representations, $q_i^1$, $q_i^2$, $a_j'$, $b_j'$, can be calculated as follows:

$$q_i^1 := \sum_{j=1}^{l_a} \frac{\exp(e_{ij}^1)}{\sum_{k=1}^{l_a} \exp(e_{ik}^1)} a_j, i = 1, \ldots, l_q \quad (3)$$

$$a_j := \sum_{i=1}^{l_q} \frac{\exp(e_{ij}^1)}{\sum_{k=1}^{l_q} \exp(e_{kj}^1)} q_i, j = 1, \ldots, l_a \quad (4)$$

$$q_i^2 := \sum_{j=1}^{l_b} \frac{\exp(e_{ij}^2)}{\sum_{k=1}^{l_b} \exp(e_{ik}^2)} b_j, i = 1, \ldots, l_q \quad (5)$$

$$b_j := \sum_{i=1}^{l_q} \frac{\exp(e_{ij}^2)}{\sum_{k=1}^{l_q} \exp(e_{kj}^2)} q_i, j = 1, \ldots, l_b, \quad (6)$$

where $q_i^1$ and $q_i^2$ are the normalized attention representations of the query sentence attending to the title and abstract of the article, and $a_j'$, $b_j'$ are the normalized attention representations of the title and abstract of the article attending to the query sentence.

The example implementation can further include a compare step. At the compare step, the example implementation can concatenate the corresponding input representation, the normalized attention representation, and the difference between the input representation and the normalized attention representation for the query sentence, the title and the abstract. Then a fully connected layer G, with ELU activation function, dropout and max pooling was applied on top of the concatenation as follows:

$$v_{1,i}:=G([q_i,q_i^1,(q_i-q_i^1)]), i=1,\ldots,l_q \quad (7)$$

$$v_{2,j}:=G([a_j,a_j^1,(a_j-a_h')]), j=1,\ldots,l_a \quad (8)$$

$$v_{3,i}:=G([q_i,q_i^2,(q_i-q_i^2)]), i=1,\ldots,l_q \quad (9)$$

$$v_{4,j}:=G([b_j,b_j^1,(b_j-b_j')]), j=1,\ldots,l_b \quad (10)$$

The example implementation can further include an aggregate step. At the aggregate step, the example implementation can aggregate elementwise the representations of the query sentence, the title and the abstract through summation as follows:

$$v_1:=\Sigma_{i=1}^{l_q} v_{1,i} \quad (11)$$

$$v_2:=\Sigma_{j=1}^{l_a} v_{2,j} \quad (12)$$

$$v_3:=\Sigma_{i=1}^{l_q} v_{3,i} \quad (13)$$

$$v_4:=\Sigma_{j=1}^{l_b} v_{4,j} \quad (14)$$

Additional features are concatenated and passed through two fully connected layers with an ELU activation function, dropout, and Batch Normalization [39] for an aggregated representation (function L( ) in equation 15).

$$v_f:=L([features]) \quad (15)$$

All aggregated representations are then concatenated and passed through two fully connected layers with ELU activation function, a dropout, a Batch Normalization, and finally a Sigmoid layer (function H( ) in equation 16).

$$\hat{y}:=H([v\_1,v\_2,v\_3,v\_4,v\_f]) \quad (16)$$

The example implementation further included model training. The modified decomposable attention model was trained and validated on the training and validation datasets using the following settings: word embedding dimensions: 300; numbers of hidden layers: [500, 300, 32, 16]; dropout rate: 0.2; optimizer: Adam [40]; loss function: binary cross-entropy; learning rate: 0.01; batch size: 20; max training epochs: 20. The example implementation also used a 300-dimensional word embedding trained on more than 17 million PubMed articles using fastText [41]. The maximum length of query sentences and article titles was set to be 100 words, while the maximum length of article abstracts was set to be 1,000 words. Early stopping was used to determine the best epoch by monitoring the loss on the validation dataset. The programs used in this study were implemented in Python. The example implementation used Keras [42] together with TensorFlow[43] to implement deep learning models.

Figure 4A:
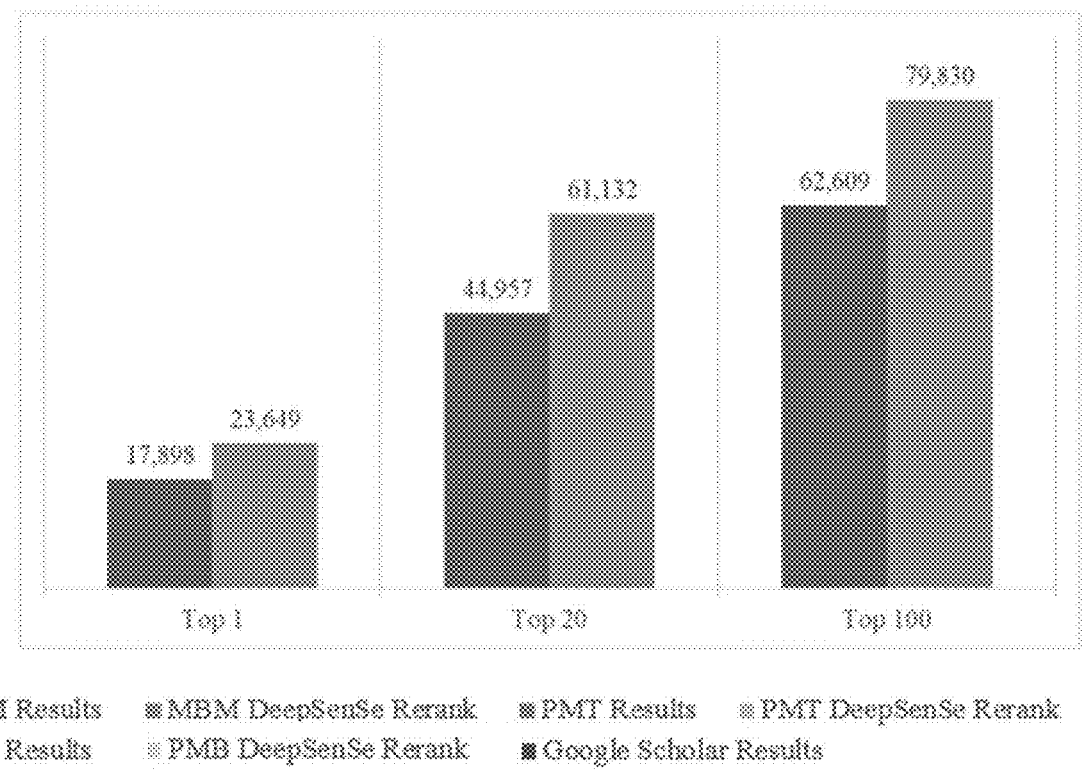
FIGS. 4A-4D illustrate bar charts showing the performance of an implementation of the present disclosure compared to other literature search methodologies.

The study evaluated DeepSenSe using an example test dataset D1. It should be understood that D1 is intended only as an example dataset, and that any other dataset can be used according to the present disclosure. In D1, there are 90,757 sentences, and each sentence has 1000 candidate relevant articles including the article the sentence actually cited. For each query sentence, the example implementation check whether the algorithm can rank the corresponding cited article in the top k articles among the 1000 candidate articles, where k=1, 10, and 100. To compare ranking algorithms, the study compares the numbers of times the ranking algorithms can rank the cited articles in top k (ntop-k) for all 90,757 cases. For MBM the ntop-k values are 17,898, 44,957, and 62,609 for k=1, 10, and 100, respectively. As a comparison, DeepSenSe was able to improve these values to 23,649, 61,132, and 79,830, respectively. The relative increases are 32%, 36% and 28%, respectively (FIG. 4A).

Figure 4B:
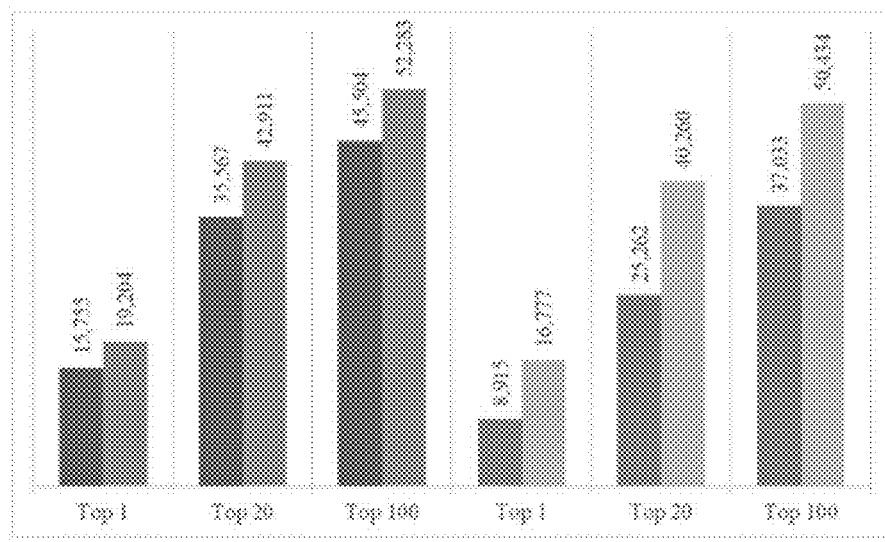

The study compared DeepSenSe with PubMed TF-IDF (PMT) algorithm using D2 with 57,123 query sentences, in which the articles cited by the query sentences were all ranked in top 1000 by both MBM and PMT. The top 1000 articles from MBM and PubMed are different. So, the example implementation was configured DeepSenSe to re-rank both sets of 1000 articles for each query sentence. Compared to MBM, the DeepSenSe model was able to improve the ntop-k values from 15,755 to 19,204, 35,567 to 42,911, and 45,504 to 52,283 for k=1, 10, and 100, respectively. The relative increases are 22% (k=1), 21% (k=10), and 15% (k=100). Compared to PMT, DeepSenSe improved the values from 8,915 to 16,777 (k=1), 25,262 to 40,260 (k=10), and 37,033 to 50,434 (k=100). The relative increases are 88%, 59%, and 36%, respectively (FIG. 4B).

Figure 4C:
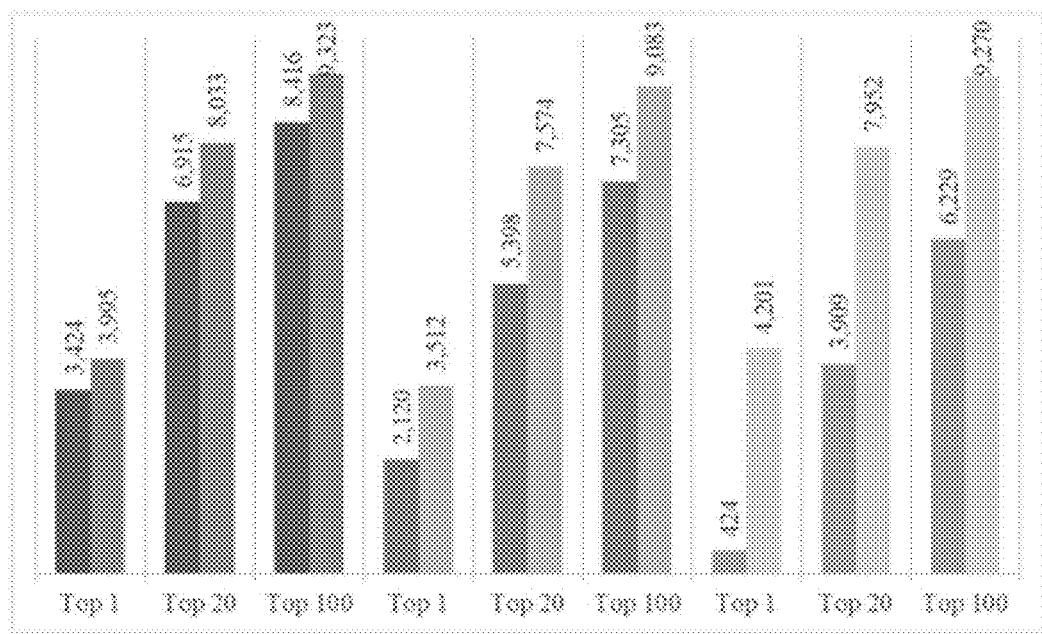

The study compared DeepSenSe with PMT and PubMed BestMatch (PMB) algorithms. The study used D3 with 9,916 sentences, where the articles cited by the query sentences were all ranked in top 1000 by MBM, PMT, and PMB. Again, DeepSenSe was able to improve the ranks substantially for all three algorithms for this dataset (FIG. 4C).

Figure 4D:
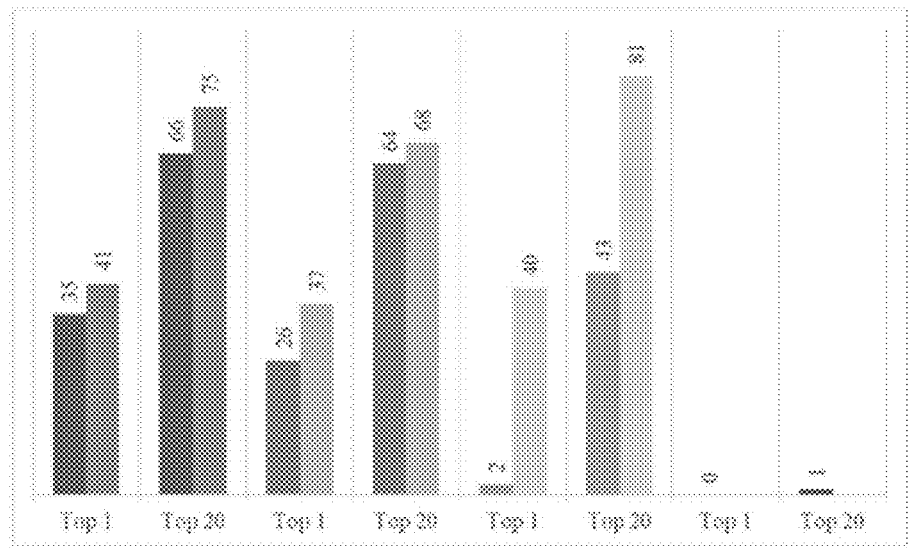

Finally, the study compared DeepSenSe with PMT, PMB, and Google Scholar using a very small test dataset with only 100 sentences, since Google does not allow automatic querying of their system. These 100 sentences were randomly selected from dataset D3. The comparison results are shown in FIG. 4D. In the Google Scholar search, the study limited the domain to PubMed database to be consistent with other searches. The performance of Google Scholar for this dataset is much worse than the other search algorithms. Again, DeepSenSe performed the best among all the search algorithms.

FIGS. 4E-4G illustrate summaries of example datasets that were used in the study. FIG. 4E illustrates a summary of a large test dataset "D1" used to test an implementation of the present disclosure. FIG. 4F illustrates a summary of a medium test dataset "D2" used to test an implementation of the present disclosure. FIG. 4G illustrates a summary of a small test dataset "D3" used to test an implementation of the present disclosure.

Results from the study are shown in FIG. 4H, which illustrates a table of results. The example results shown in FIG. 4H include an example analysis of In the example results illustrated in FIG. 4H DeepSenSe and MBM ranked very differently. The study shows that DeepSenSe matches meanings better than MBM, which, as a BM25 based method, matches exact keywords better. For search engine comparison, MBM is much better than PubMed_TF and PubMed_BM. The rerank from the example implementation of the present disclosure including a deep learning model improved the accuracy significantly for all search engines.

FIG. 4H also illustrates examples for which DeepSenSe had very different rankings from MBM. FIG. 4H further illustrates analysis of the MBM search engine and the deep learning model results. In category A, both the MBM search engine and the model have bad results because SENs do not contain terminologies. In category B, the MBM search engine cannot find common words. However, the model according to an example implementation of the present disclosure can catch the similarity of related words, such as Spd, Spm, and Polyamines. In category C, it was hard to distinguish the cited article from others because those articles contained many words in SEN like proline accumulation, plant, and stress. The PMID of the rank 1 article in our model was 18379856. In category D-1, the MBM search engine did not have a good result because SEN used African and Nigerian, but ABS used Nigeria. The example implementation was able to "know" they were related. The PMID of the rank 1 article in the search result was 10805050, which contained African and Nigerian. In D-3, Sentence only mentioned LELC, which is an abbreviation of Lymphoepithelioma-like carcinoma.

The study further included an analysis of the performance of Search by Query, Question and Narrative for BM25 vs. Deepsense Rerank. FIG. 4I illustrates a table comparing BM25 vs. Deepsense for the top 100 BM25 Returns.

Document retrieval using full sentences as queries can help users find relevant documents more effectively. It is also very useful for building question-answering systems, identifying relevant citations for scientific manuscripts, and comparing new findings with previous knowledge. The example implementation includes a trained deep learning model, called DeepSenSe, trained using a large volume of labeled data obtained from the citation data of PMC full-text articles. Tested on large test datasets, DeepSenSe was able to substantially improve the rankings of existing methods including a modified BM25 (MBM) and PubMed's ranking algorithms. The combination of MBM and DeepSenSe gave the best performance overall.

Several different deep learning architectures can be used, but the decomposable attention model was selected for its performance in this example implementation (in terms of both training and prediction). The BERT model had better performance, but is much slower in training and prediction. Implementations of the present disclosure can be trained with more powerful hardware to create more sophisticated models and to achieve even better overall performance in the future.

Implementations of the present disclosure can improve the usability of search engines by improving the results of long queries. For example, user behavior analysis on PubMed shows that most queries are short and over 80% of all queries had no more than four tokens [44-46]. This may be due to the current search engines not performing well for long queries, so that users do not tend to use them as much. This user behavior could change if they find long queries can give them better results.

In this study, it was considered whether a relevant article will rank in the top 1, 20, and 100, instead of its absolute rank. Since over 80% of users only clicked on the results from the first page [44], it can be important to show the most relevant articles on the first page. If a page shows 20 results then being ranked in the top 20 means the article is on the first page, and the article has a much higher chance to be found by a user.

The example implementation of the present disclosure used ELU instead of ReLU because in the example implementation the effect of words with opposite meanings was also significant. In some implementations, if ELU is not used, the example model can predict very high relevance scores for almost all search results. However, it should be understood that both ReLU and ELU are intended as only non-limiting examples, and that different activation functions can be included in various implementations of the present disclosure.

MBM, PubMed, and Google Scholar used in the study are not optimized for sentence queries. So, the comparison in this study showed that DeepSenSe can improve MBM and PubMed ranking results substantially for sentence queries using citation data as tests. It should be understood that implementations of the present disclosure can be configured to operate on general queries instead of sentence queries, and that the query structures described with reference to the example implementation are only non-limiting examples.

In addition to providing more relevant search results for sentence queries for search engines, implementations of the present disclosure can be used to scan full-text documents to identify relevant citations for the sentences in the documents. For example, implementations of the present disclosure can help authors add citations to the articles they are writing or help institutions/agencies with document review by assessing the quality and completeness of the citations in the documents.

Example Computing Device

It should be appreciated that the logical operations described herein with respect to the various figures may be implemented (1) as a sequence of computer implemented acts or program modules (i.e., software) running on a computing device (e.g., the computing device described in FIG. 5), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 5:
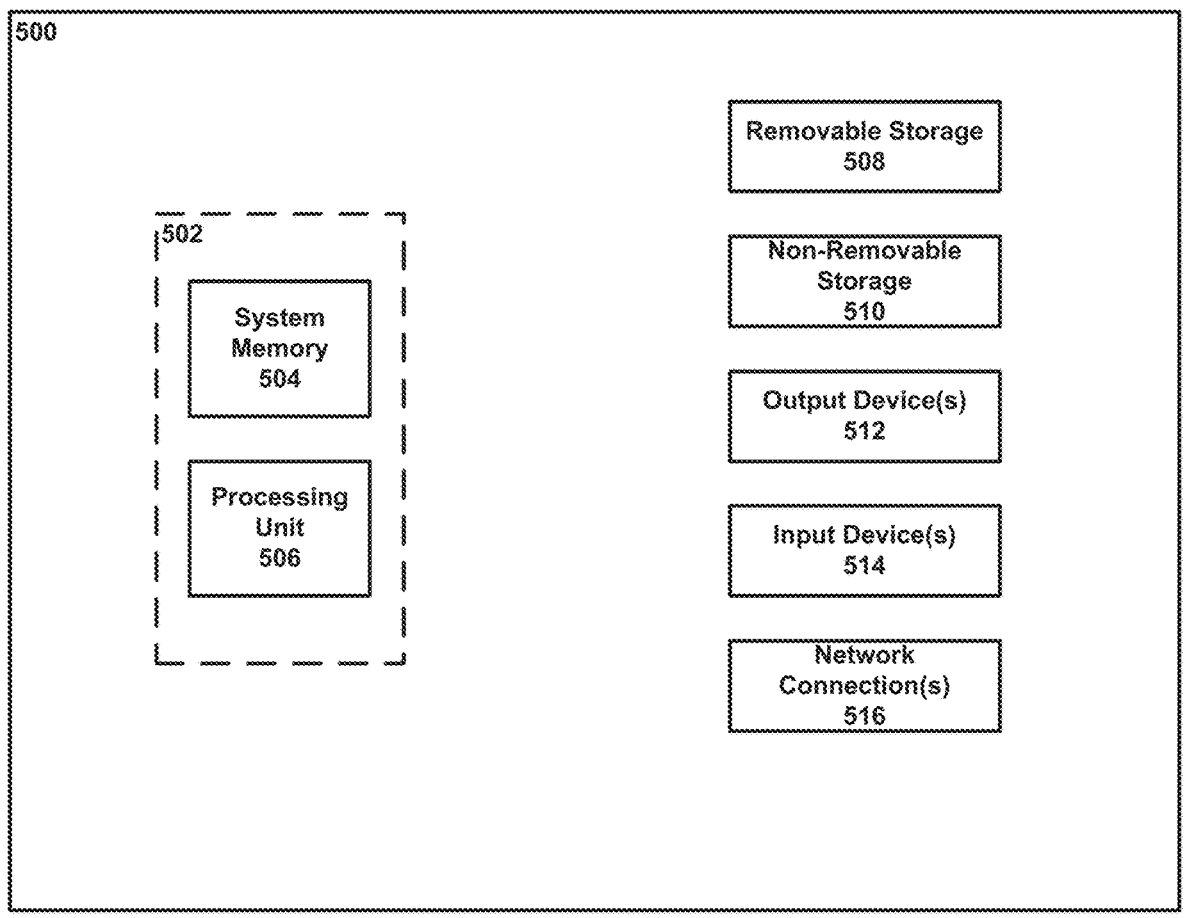
FIG. 5 illustrates an example computing device.

Referring to FIG. 5, an example computing device 500 upon which the methods described herein may be implemented is illustrated. It should be understood that the example computing device 500 is only one example of a suitable computing environment upon which the methods described herein may be implemented. Optionally, the computing device 500 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500. The computing device 500 may also include a bus or other communication mechanism for communicating information among various components of the computing device 500.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Tangible, computer-readable media refers to any media that is capable of providing data that causes the computing device 500 (i.e., a machine) to operate in a particular fashion. Various computer-readable media may be utilized to provide instructions to the processing unit 506 for execution. Example tangible, computer-readable media may include, but is not limited to, volatile media, non-volatile media, removable media and non-removable media implemented in any method or technology for storage of information such as computer readable instructions, data structures, program modules or other data. System memory 504, removable storage 508, and non-removable storage 510 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

REFERENCES

[1] L. Yeganova, et al., "How to Interpret PubMed Queries and Why It Matters," J Am Soc Inf Sci Technol, vol. 60, pp. 264-274, February 2009.

[2] L. J. Jensen, et al., "Literature mining for the biologist: from information retrieval to biological discovery," Nat Rev Genet, vol. 7, pp. 119-29, February 2006.

[3] J. Jiang and C. Zhai, "An empirical study of tokenization strategies for biomedical information retrieval," Information Retrieval, vol. 10, pp. 341-363, 2007 Oct. 1, 2007.

[4] Z. Lu, et al., "Evaluating relevance ranking strategies for MEDLINE retrieval," J Am Med Inform Assoc, vol. 16, pp. 32-6, January-February 2009.

[5] Z. Lu, et al., "Evaluation of Query Expansion Using MeSH in PubMed," Inf Retr Boston, vol. 12, pp. 69-80, 2009.

[6] W. J. Wilbur, et al., "Spelling Correction in the Pubmed Search Engine," Inf Retr Boston, vol. 9, pp. 543-564, November 2006.

[7] Z. Lu, et al., "Finding query suggestions for PubMed," AMIA Annu Symp Proc, vol. 2009, pp. 396-400, Nov. 14, 2009.

[8] S. Mohan, et al., "Deep Learning for Biomedical Information Retrieval: Learning Textual Relevance from Click Logs," in BioNLP 2017, Vancouver, Canada, 2017, pp. 222-231.

[9] B. Mitra and N. Craswell, "Neural Models for Information Retrieval," ArXiv, vol. abs/1705.01509, 2017.

[10] Y. Zhang, et al., "Neural Information Retrieval: A Literature Review," ArXiv, vol. abs/1611.06792, 2016.

[11] J. Guo, et al., "A Deep Relevance Matching Model for Ad-hoc Retrieval," Proceedings of the 25th ACM International on Conference on Information and Knowledge Management, 2016.

[12] S. Zhao, et al., "GRAPHENE: A Precise Biomedical Literature Retrieval Engine with Graph Augmented Deep Learning and External Knowledge Empowerment," Proceedings of the 28th ACM International Conference on Information and Knowledge Management, 2019.

[13] J. Guo, et al., "A Deep Look into Neural Ranking Models for Information Retrieval," ArXiv, vol. abs/1903.06902, 2019.
[14] A. Allot, et al., "LitSense: making sense of biomedical literature at sentence level," Nucleic Acids Res, vol. 47, pp. W594-W599, Jul. 2, 2019.
[15] S. Mohan, et al., "A Fast Deep Learning Model for Textual Relevance in Biomedical Information Retrieval," arXiv:1802.10078 [cs], 2018 Feb. 26/2018.
[16] B. Hu, et al., "Convolutional Neural Network Architectures for Matching Natural Language Sentences," arXiv:1503.03244 [cs], 2015 Mar. 11/2015.
[17] Z. Lu and H. Li, "A deep architecture for matching short texts," 2013, pp. 1367-1375.
[18] Z. Lu, "PubMed and beyond: a survey of web tools for searching biomedical literature," Database (Oxford), vol. 2011, p. baq036, 2011.
[19] S. Robertson and H. Zaragoza, "The Probabilistic Relevance Framework: BM25 and Beyond," Foundations and Trends in Information Retrieval, vol. 3, pp. 333-389, 2009.
[20] A. Trotman, et al., "Improvements to BM25 and Language Models Examined," presented at the Proceedings of the 2014 Australasian Document Computing Symposium, Melbourne, VIC, Australia, 2014.
[21] Y. Lv and C. Zhai, When documents are very long, BM25 fails!, 2011.
[22] N. Fiorini, et al., "How user intelligence is improving PubMed," Nature Biotechnology, vol. 36, pp. 937-945, 2018 Nov. 1, 2018.
[23] J. Lin and W. J. Wilbur, "Modeling Actions of PubMed Users with N-Gram Language Models," Inf Retr Boston, vol. 12, pp. 487-503, Sep. 12, 2008.
[24] N. Fiorini, et al., "Best Match: New relevance search for PubMed," PLOS Biology, vol. 16, p. e2005343, 2018.
[25] T. Liu, "Learning to rank for information retrieval," in SIGIR '10, 2010.
[26] C. Burges, et al., "Learning to Rank Using an Ensemble of Lambda-Gradient Models," in Yahoo! Learning to Rank Challenge, 2011.
[27] C. Burges, et al., "Learning to rank using gradient descent," in the 22nd international conference, 2005, pp. 89-96.
[28] N. Fiorini, et al., "Towards PubMed 2.0," eLife, vol. 6.
[29] N. Fiorini, et al., "PubMed Labs: an experimental system for improving biomedical literature search," Database: The Journal of Biological Databases and Curation, vol. 2018, 2018 Sep. 18/2018.
[30] A. Parikh, et al., "A Decomposable Attention Model for Natural Language Inference," Proceedings of the 2016 Conference on Empirical Methods in Natural Language Processing, pp. 2249-2255, 2016.
[31] F. Khani, et al., "Evidence for molecular differences in prostate cancer between African American and Caucasian men," Clin Cancer Res, vol. 20, pp. 4925-34, Sep. 15, 2014.
[32] S. E. Robertson, et al., "Okapi at TREC-3," 1996, pp. 109-126.
[33] (2019). Biomedical Knowledge Discovery Engine (BioKDE). Available: https://www.biokde.com
[34] S. Bird, "Natural Language Processing with Python," p. 504.
[35] P. J. Cock, et al., "Biopython: freely available Python tools for computational molecular biology and bioinformatics," Bioinformatics, vol. 25, pp. 1422-3, Jun. 1, 2009.
[36] J. Devlin, et al., "BERT: Pre-training of Deep Bidirectional Transformers for Language Understanding," arXiv:1810.04805 [cs], 2019 May 24/2019.
[37] A. P. Parikh, et al., "A Decomposable Attention Model for Natural Language Inference," arXiv:1606.01933 [cs], 2016 Sep. 25/2016.
[38] D.-A. Clevert, et al., "Fast and Accurate Deep Network Learning by Exponential Linear Units (ELUs)," arXiv:1511.07289 [cs], 2016 Feb. 22/2016.
[39] S. Ioffe and C. Szegedy, "Batch Normalization: Accelerating Deep Network Training by Reducing Internal Covariate Shift," arXiv:1502.03167 [cs], 2015 Mar. 2/2015.
[40] D. P. Kingma and J. Ba, "Adam: A Method for Stochastic Optimization," arXiv:1412.6980 [cs], 2017 Jan. 29/2017.
[41] P. Bojanowski, et al., "Enriching Word Vectors with Subword Information," Transactions of the Association for Computational Linguistics, vol. 5, pp. 135-146, 2017 2017.
[42] F. Chollet and others, "Keras," 2015 2015.
[43] M. Abadi, et al., "TensorFlow: Large-Scale Machine Learning on Heterogeneous Distributed Systems," arXiv:1603.04467 [cs], 2016 Mar. 16/2016.
[44] R. Islamaj Dogan, et al., "Understanding PubMed user search behavior through log analysis," Database (Oxford), vol. 2009, p. bap018, 2009.
[45] A. S. M. Mosa and I. Yoo, "A Study on Pubmed Search Tag Usage Pattern: Association Rule Mining of a Full-day Pubmed Query Log," BMC Medical Informatics and Decision Making, vol. 13, p. 8, 2013 Jan. 9/2013.
[46] J. R. Herskovic, et al., "A Day in the Life of PubMed: Analysis of a Typical Day's Query Log," Journal of the American Medical Informatics Association: JAMIA, vol. 14, pp. 212-220, 2007 2007.

What is claimed:

1. A computer-implemented method of training a machine learning model configured for literature retrieval, the method comprising:
receiving a plurality of full-text articles; extracting, from the plurality of full-text articles, a plurality of positive sentence-citation pairs, each positive sentence-citation pair comprising a respective citing sentence and at least one cited article that is associated with the respective citing sentence;
creating a labeled dataset comprising the plurality of positive sentence-citation pairs;
for each respective citing sentence, generating at least one negative sentence-citation pair comprising the respective citing sentence and at least one cited article that is not associated with the respective citing sentence, wherein the at least one cited article is randomly selected;
adding the negative sentence-citation pairs to the labeled dataset; and
training, using the labeled dataset, the machine learning model to rank results returned by a search engine in response to a full-sentence query.

2. The computer-implemented method of claim 1, wherein the machine learning model is a deep learning model.

3. The computer-implemented method of claim 2, wherein the deep learning model comprises an artificial neural network.

4. The computer-implemented method of claim 2, wherein the deep learning model is a decomposable attention model.

5. The computer-implemented method of claim 1, wherein the plurality of full-text articles are received from a digital literature archive.

6. A computer-implemented method for retrieving literature from an archive, the method comprising:
- receiving a query comprising a sentence;
- inputting the query into a machine learning model, wherein the machine learning model is trained by:
  - receiving a plurality of full-text articles;
  - extracting, from the plurality of full-text articles, a plurality of positive sentence-citation pairs, each positive sentence-citation pair comprising a respective citing sentence and at least one cited article that is associated with the respective citing sentence;
  - creating a labeled dataset comprising the plurality of positive sentence-citation pairs;
  - for each respective citing sentence, generating at least one negative sentence-citation pair comprising the respective citing sentence and at least one cited article that is not associated with the respective citing sentence, wherein the at least one cited article is randomly selected;
  - adding the negative sentence-citation pairs to the labeled dataset; and
  - training, using the labeled dataset, the machine learning model to rank results returned by a search engine in response to a full-sentence query; and
- receiving, from the machine learning model, a response to the query, wherein the response identifies a full-text article.

7. The method of claim 6, wherein the step of creating the labeled dataset further comprises:
- generating a plurality of negative sentence-citation pairs, each negative sentence-citation pair comprising a respective citing sentence and at least one cited article that is not associated with the respective citing sentence; and
- adding the negative sentence-citation pairs to the labeled dataset.

8. The method of claim 6, wherein the machine learning model is a deep learning model.

9. The method of claim 8, wherein the deep learning model comprises an artificial neural network.

10. The method of claim 8 wherein the deep learning model is a decomposable attention model.

11. The method of claim 6, wherein the plurality of full-text articles are received from a digital literature archive.

12. A computer-implemented method for providing ranked responses to a query, the method comprising:
- receiving a query comprising a sentence;
- inputting the query into a search engine;
- obtaining a plurality of results corresponding to the query from the search engine; and
- ranking the plurality of results using a machine learning model trained by:
  - receiving a plurality of full-text articles;
  - extracting, from the plurality of full-text articles, a plurality of positive sentence-citation pairs, each positive sentence-citation pair comprising a respective citing sentence and at least one cited article that is associated with the respective citing sentence;
  - creating a labeled dataset comprising the plurality of positive sentence-citation pairs;
  - for each respective citing sentence, generating at least one negative sentence-citation pair comprising the respective citing sentence and at least one cited article that is not associated with the respective citing sentence, wherein the at least one cited article is randomly selected
  - adding the negative sentence-citation pairs to the labeled dataset; and training, using the labeled dataset, the machine learning model to re-rank results returned by a search engine in response to a full-sentence query.

13. The computer-implemented method of claim 12, wherein the machine learning model is a deep learning model.

14. The computer-implemented method of claim 12, wherein the plurality of full-text articles are received from a digital literature archive.

15. Computer-implemented method of claim 1, wherein the at least one cited article is randomly selected by a similarity query of the plurality of full-text articles, and wherein the similarity query comprises a BM25 query or a modified BM25 query.

16. The computer-implemented method of claim 6, wherein the at least one cited article is randomly selected by a similarity query of the plurality of full-text articles, and wherein the similarity query comprises a BM25 query or a modified BM25 query.

17. The computer-implemented method of claim 12, wherein the at least one cited article is randomly selected by a similarity query of the plurality of full-text articles, and wherein the similarity query comprises a BM25 query or a modified BM25 query.

\* \* \* \* \*